United States Patent [19]

Holowach et al.

[11] Patent Number: 4,662,658

[45] Date of Patent: May 5, 1987

[54] SEAL

[75] Inventors: Joseph Holowach, Cincinnati; James A. Crowley, West Chester, both of Ohio

[73] Assignee: General Electric Company, Cincinnati, Ohio

[21] Appl. No.: 616,624

[22] Filed: Jun. 4, 1984

[51] Int. Cl.[4] .............................................. F16L 25/00
[52] U.S. Cl. .................................... 285/177; 285/419; 285/917; 285/345
[58] Field of Search .............. 285/DIG. 18, 373, 419, 285/345, 346, 424, 338, 12, 177, 414, 415, 917; 308/244

[56] References Cited

U.S. PATENT DOCUMENTS

| | | | |
|---|---|---|---|
| 1,625,545 | 4/1927 | Karmazin | 308/244 |
| 2,231,512 | 2/1941 | Smith | 285/419 |
| 2,637,972 | 5/1953 | Laucher | 60/35.6 |
| 3,127,182 | 3/1964 | Wardleigh | 285/DIG. 18 |
| 4,071,268 | 1/1978 | Holling et al. | 285/DIG. 18 |
| 4,071,269 | 1/1978 | Holling et al. | 285/DIG. 18 |

FOREIGN PATENT DOCUMENTS 1562486  4/1969  France ........................ 285/345

*Primary Examiner*—Dave W. Arola
*Attorney, Agent, or Firm*—Douglas S. Foote; Derek P. Lawrence

[57] ABSTRACT

Seal means for reducing the gas flow through the space between the opposing ends of first and second concentric axially disposed cylinders is disclosed. The seal means includes a presizeable annular leaf seal concentrically mateable with the first cylinder. In addition, the seal means includes securing means for securing the left seal to the second cylinder. In a specific embodiment, the seal means provides an effective seal between a turbine rear frame and mixer liner.

4 Claims, 2 Drawing Figures

SEAL

The Government has rights in this invention pursuant to Contract No. F33657-81-C-0236 awarded by the United States Department of the Air Force.

This invention relates generally to seals for use between two concentric axially disposed cylinders, and, more particularly, to a mixer forward air seal in a gas turbine engine.

BACKGROUND OF THE INVENTION

Gas turbine engines generally comprise a compressor for compressing air flowing through the engine, a combustor in which fuel is mixed with the compressed air and ignited to form a high energy gas stream, and a turbine which includes a rotor for driving the compressor. In addition, many gas turbine engines are of the turbofan type in which a fan located forward of the compressor is driven by a second turbine rotor. The fan produces a flow stream which bypasses the compressor, combustor, and turbine to provide propulsion.

One method of increasing the thrust output of the engine is to provide an augmentation system. Such a system injects additional fuel downstream of the second turbine which is ignited to provide an additional high energy gas stream. Prior to such ignition, the gas stream through the turbine is typically mixed with the fan airflow to provide increased oxygen for combustion.

In order to obtain proper mixing, the augmentation system includes a mixer with a generally cylindrical liner at its forwardmost end relative to the engine. This liner will generally line up with the cylindrical rear turbine frame. The gap between these two cylindrical members, liner and turbine frame, must be sealed in order to prevent premature mixing of turbine gas and fan air. Even in engines without an augmentor, it may be desirable to have a mixer which requires similar sealing.

The assembly of either augmentation system or mixer with the engine is complicated by the fact that each is normally located within the engine exhaust duct. This presents the problem of providing a seal for the gap between the two cylindrical members which is both reliable and easily installed.

Prior attempts to solve this problem have met with varying degrees of success. For example, "fishmouth" seals have been used in the past. Such seals include an axially extending recess on one member and an axially extending tongue on the other member which mate when the mixer and turbine frame are brought together. Fishmouth seals tend to be loose fitting so that some air/gas leakage occurs through the gap between the two members.

Seals employing piston rings have also been used in the past. These seals have a flexible ring which is retained by a radially directed recess on one member while maintaining contact with the second member. Seals with piston rings are effective, however, they are difficult to install and have also proven to be heavy and expensive to manufacture.

OBJECTS OF THE INVENTION

It is an object of the present invention to provide a new and improved seal for reducing the gas flow through the space between opposing ends of concentric axially disposed cylinders.

It is another object of the present invention to provide a new and improved forward air seal for a mixer liner.

It is still another object of the present invention to provide a light-weight augmentor liner forward air seal which is easily and reliably installed within the exhaust duct of a gas turbine engine.

SUMMARY OF THE INVENTION

In accordance with the present invention, seal means for reducing the gas flow through the space between opposing ends of first and second concentric axially disposed cylinders is disclosed. The seal means includes a presizeable annular leaf seal concentrically mateable with the first cylinder. In addition, the seal means includes securing means for securing the leaf seal to the end of the second cylinder.

DETAILED DESCRIPTION OF THE INVENTION

Figure 1:
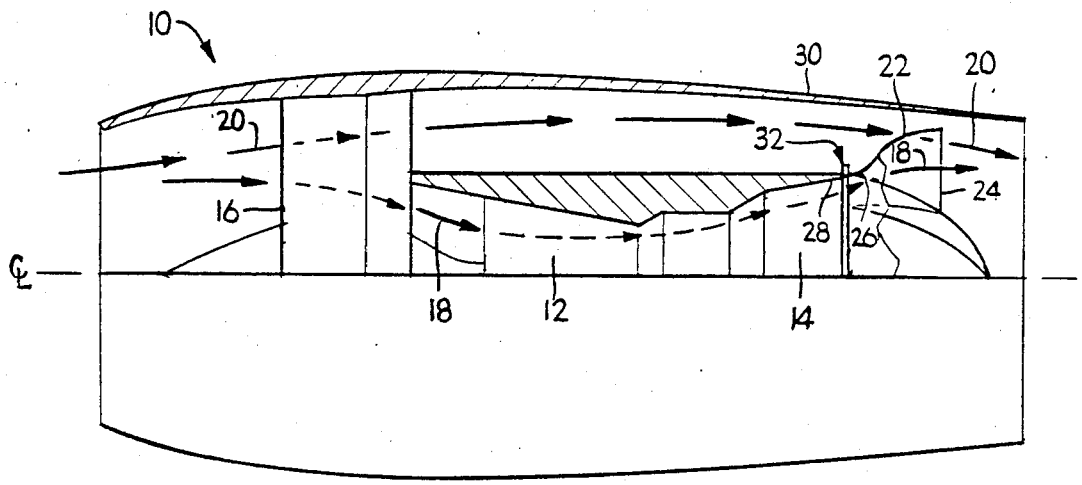
FIG. 1 is a schematic, axial cross-sectional view of a gas turbine engine incorporating the present invention.

FIG. 1 shows a gas turbine engine 10 of the mixed flow turbofan type. Engine 10 includes a gas generator 12 and a low pressure turbine 14 which drives a fan 16. Air entering engine 10 will be drawn either through core flowpath 18 or through fan flowpath 20.

Located downstream of the low pressure turbine 14 is mixer 22. Hot gases in flowpath 18 and air in flowpath 20 will combine at the outlet 24 of mixer 22. The forward portion of mixer 22 includes a mixer liner 26 which is generally cylindrical. Liner 26 will generally align with the cylindrical turbine rear frame 28. It should be clear that although the embodiment described herein is directed toward a seal for a mixer with cylindrical liner, it applies equally to a seal for an augmentation system with cylindrical liner as well as seals for use between any two cylindrical members.

It is important to reduce the gas flow through the space between the opposing ends of mixer liner 26 and turbine frame 28. As used herein, the term gas flow refers to the flow of gas and/or air. Such gas flow through the space which is forward of mixer 22 results in a decrease in engine performance. For example, air from fan flowpath 20 leaking through this space into core flowpath 18 remains in the outer boundary layer of the core stream and does not penetrate the core stream for proper mixing efficiency. In addition, any gas leaking from core flowpath 18 through the space into fan flowpath 20 may present overheating problems to casing 30.

Figure 2:
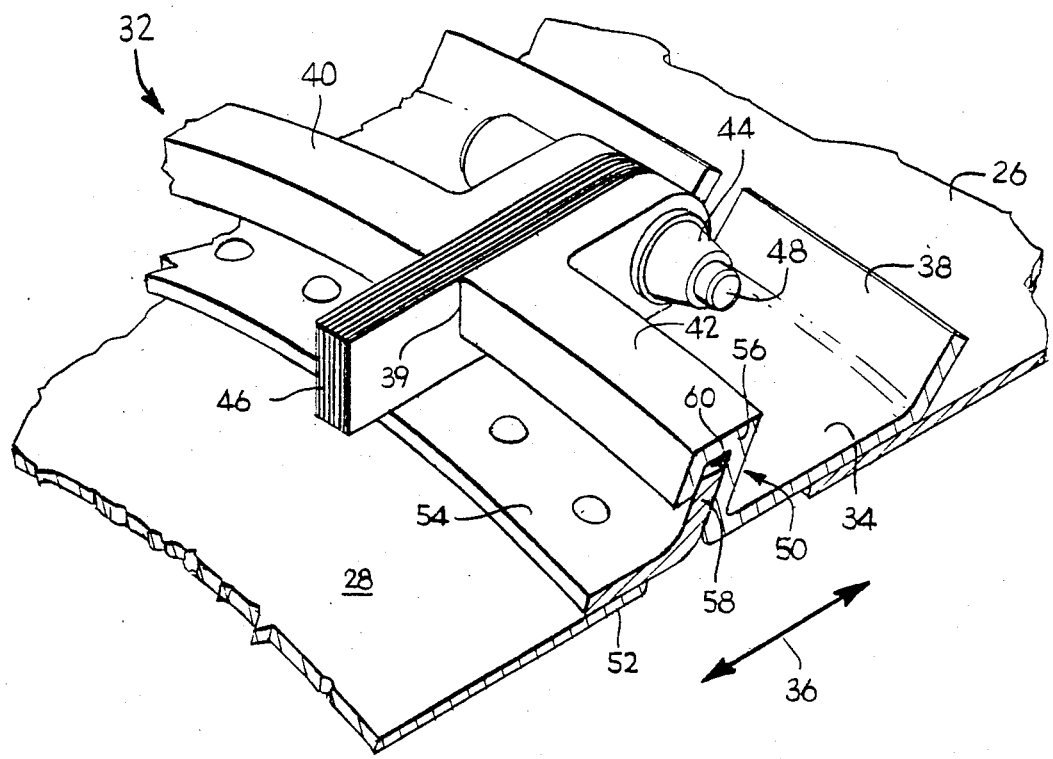
FIG. 2 is an enlarged, partial perspective view of the seal shown in FIG. 1.

FIG. 2 shows a perspective view of the seal means 32 for reducing the gas flow through the space between the opposing ends of mixer liner 26 and turbine rear frame 28. Seal means 32 comprises a presizeable annular leaf seal 34. Leaf seal 34 is generally axially directed as shown by arrow 36. Leaf seal 34 includes a generally radially outwardly directed lip 38. Lip 38 stiffens leaf seal 34 and eases the installation of liner 26 as will be discussed more thoroughly hereinafter.

Seal means 32 has an axial split 39 thereby forming opposing seal ends 40 and 42. Seal 32 further includes joining means 44 for joining ends 40 and 42 and sizing means 46 for varying the radial size of seal 32. For example, sizing means 46 may include one or more shims for placement between opposing ends 40 and 42, and joining means 44 may include a bolt 48 for joining ends 40 and 42.

Seal means 32 further includes securing means 50 for securing leaf seal 34 to the end 52 of turbine rear frame 28. Securing means 50 comprises support ring 54 and retaining ring 56. Support ring 54 is rigidly secured to turbine rear frame 28 and has an outwardly directed flange 58. Retaining ring 56 is integral with or securely fastened to leaf seal 34 and includes a radially directed recess 60 which is adapted to engage flange 58. Flange 58 is slideably moveable within recess 60 so as to allow differential radial movement between turbine rear frame 28 and mixer liner 26.

An important advantage of seal means 32 is its relative ease of installation. In normal assembly, mixer 22 must be inserted into casing 30 so that mixer liner 26 is concentric with and axially disposed relative to turbine frame 28. Further, seal means 32 must maintain close tolerances with respect to liner 26 and frame 28.

Prior to assembly, annular leaf seal 34 is presized to be concentrically mateable with mixer liner 26. This is accomplished by varying the number of shims 46. In this manner, the tolerance between leaf seal 34 and liner 26 can be accurately adjusted to achieve a good sliding fit therebetween. Next, leaf seal 34 is removed from liner 26 and bolt 48 is loosened or removed so that retaining ring 56 can be expanded allowing recess 60 to fit over flange 58 of support ring 54. When bolt 48 is tightened, the radius of leaf seal 34 will again return to its presized dimension. When mixer 22 is inserted into casing 30, liner 26 will mate with leaf seal 34.

In operation, leaf seal 34 is effective for reducing gas flow from core flowpath 18 into fan flowpath 20 and from fan flowpath 20 into core flowpath 18. Generally, the air in fan flowpath 20 will be at a slightly higher pressure than the gas in core flowpath 18 causing leaf seal 34 to press against liner 26 for improved sealing effectiveness. At certain engine operating conditions the gas in core flowpath 18 will be at a higher pressure than the air in fan flowpath 20. Under such conditions, lip 38 on leaf seal 34 will sufficiently stiffen the seal so as to resist radial movement of leaf seal 34 thereby providing an effective seal.

Differential motion between turbine rear frame 28 and liner 26 is provided for in seal means 32. Relative axial motion is permitted by the sliding contact between leaf seal 34 and liner 26. Differential radial motion is provided for by allowing recess 60 to be deeper than flange 58. This extra depth allows flange 58 to expand and contract without affecting the quality of the seal.

It will be clear to those skilled in the art that the present invention is not limited to the specific embodiment described and illustrated herein. Nor is the invention limited to a seal between a turbine rear frame and mixer liner. Rather, the invention applies equally to means for reducing gas flow through the space between opposing ends of any two concentric axially disposed cylinders.

It will be understood that the dimensions and proportional and structural relationships shown in the drawings are illustrated by way of example only and those illustrations are not to be taken as the actual dimensions or proportional structural relationships used in the seal of the present invention.

Numerous modifications, variations, and full and partial equivalents can be undertaken without departing from the invention as limited only by the spirit and scope of the appended claims.

What is desired to be secured by Letters Patent of the United States is the following.

What is claimed is:

1. Seal means for reducing the gas flow through the space between the opposing ends of first and second concentric axially disposed cylinders comprising:
    a presizeable annular leaf seal concentrically mateable with and sealingly engagable with substantially all of said end of said first cylinder; and
    securing means for securing said leaf seal to said end of said second cylinder;
    wherein said securing means includes:
        a ring rigidly secured to said second cylinder and having an outwardly directed flange; and
        a retaining ring connected to said leaf seal and comprising a radially directed recess adapted to engage said flange;
    wherein said flange is slideably moveable within said recess so as to allow differential radial movement between said first and second cylinders.

2. Seal means, as recited in claim 1, wherein said leaf seal is generally axially directed with a generally radially outwardly directed lip.

3. Seal means, as recited in claim 1, wherein said leaf seal has an axial split thereby forming opposing seal ends and including:
    joining means for joining said seal ends; and
    sizing means for varying the radial size of said seal.

4. Seal means, as recited in claim 3, wherein said sizing means includes at least one shim positioned between said opposing seal ends.

* * * * *